United States Patent
Herzog

(10) Patent No.: US 7,802,486 B2
(45) Date of Patent: Sep. 28, 2010

(54) PORTABLE DISCRETE GROUNDWATER SAMPLING SYSTEM

(75) Inventor: David W. Herzog, Orangevale, CA (US)

(73) Assignee: Conestoga-Rovers & Associates, Rancho Cordova, CA (US)

( * ) Notice: Subject to any disclaimer, the term of this patent is extended or adjusted under 35 U.S.C. 154(b) by 604 days.

(21) Appl. No.: 11/818,522

(22) Filed: Jun. 13, 2007

(65) Prior Publication Data

US 2008/0022787 A1 Jan. 31, 2008

Related U.S. Application Data

(60) Provisional application No. 60/813,419, filed on Jun. 14, 2006.

(51) Int. Cl.
*G01N 1/00* (2006.01)

(52) U.S. Cl. .................................................. 73/864.34

(58) Field of Classification Search ........................ None
See application file for complete search history.

(56) References Cited

U.S. PATENT DOCUMENTS

| | | | |
|---|---|---|---|
| 4,050,315 A | 9/1977 | Markfelt | |
| 4,254,830 A | 3/1981 | Garney et al. | |
| 4,266,429 A | 5/1981 | Brovold | |
| 4,271,704 A | 6/1981 | Peters | |
| 4,538,683 A | 9/1985 | Chulick | |
| 4,701,107 A | 10/1987 | Dickinson et al. | |
| 4,807,707 A * | 2/1989 | Handley et al. | 175/20 |
| 4,811,599 A * | 3/1989 | Johnson et al. | 73/152.23 |
| 4,857,473 A | 8/1989 | Margaritz et al. | |
| 5,035,149 A * | 7/1991 | Wierenga | 73/863.23 |
| 5,168,765 A * | 12/1992 | Broussard | 73/864.74 |
| 5,228,345 A | 7/1993 | Vales | |
| 5,293,931 A | 3/1994 | Nichols et al. | |
| RE34,754 E * | 10/1994 | Dickinson et al. | 166/64 |
| 5,454,275 A | 10/1995 | Kabis | |
| 5,686,673 A | 11/1997 | Kabis | |
| 5,794,696 A | 8/1998 | Gibson et al. | |
| 5,889,217 A * | 3/1999 | Rossabi et al. | 73/864.74 |
| 5,934,375 A * | 8/1999 | Peterson | 166/264 |
| 5,979,569 A | 11/1999 | Heller | |
| 5,996,423 A | 12/1999 | Baghel et al. | |
| 6,338,282 B1 | 1/2002 | Gilbert | |
| 6,360,620 B1 | 3/2002 | Jensen | |
| 6,609,434 B2 | 8/2003 | Hubbell et al. | |
| 6,837,120 B2 | 1/2005 | Cordry | |

OTHER PUBLICATIONS

PCT International Search Report for PCT Application No. PCT/US07/14097, mailed Feb. 8, 2008.

* cited by examiner

*Primary Examiner*—Robert R Raevis
(74) *Attorney, Agent, or Firm*—Finnegan, Henderson, Farabow, Garrett & Dunner, LLP

(57) ABSTRACT

Methods and systems are presented for discrete sampling of groundwater. The methods and systems presented are directed toward collecting groundwater samples at one or more locations below ground surface using one or more portable, vacuum-activated sampling devices including a collection chamber, one or more check valves, and a vacuum tube within a main body for activating the check valve to admit groundwater into the collection chamber. A groundwater inlet filter can be provided upstream of the check valve for some systems. A groundwater inlet chamber having a separate vacuum tube for purging the inlet chamber may be provided for other systems.

31 Claims, 4 Drawing Sheets

PORTABLE DISCRETE GROUNDWATER SAMPLING SYSTEM

This application claims the benefit of U.S. Provisional Application No. 60/813,419, filed Jun. 14, 2006, which is hereby incorporated by reference in its entirety.

Provided are certain systems and methods for water sampling, and more specifically, systems and methods for collecting discrete samples of groundwater.

Current groundwater sampling systems often create a significant gradient or turbulence within the sampling area, resulting in samples that may contain groundwater mixed from various depths in a sampling well. Many current groundwater sampling systems utilize a passive diffusion method whereby groundwater enters a sample collection container, commonly a polyethylene bag. Some contaminants, e.g. ethers and alcohols, cannot be collected by passive diffusion systems. Passive diffusion systems also work slowly, thus mixing concentrations of groundwater contaminants over time and limiting the effectiveness of passive diffusion groundwater sampling for collecting a sample at a discrete point in time. Many existing groundwater sampling systems require a person with specialized knowledge of the system in order to be properly installed and operated. Existing groundwater systems often require that samples be transferred to a container separate from the collection container before they can be analyzed, increasing the risk of sample contamination.

Provided are systems and methods for collecting discrete samples of groundwater.

In accordance with some embodiments of the disclosed subject matter, systems and methods for collecting groundwater samples at one or more locations below a ground surface are presented. In some embodiments, the system includes at least one body configured to be disposed below ground surface, the body having a sample collection chamber. In some embodiments, the body includes at least one vacuum tube in flow communication with the sample collection chamber and a sample collection mechanism attached to the body, the mechanism including a first check valve for admitting groundwater from the below ground surface location into the sample collection chamber when a vacuum is applied to the collection vacuum tube.

In some embodiments, a method for collecting groundwater samples is disclosed, the method comprising providing a body having a collection chamber, the body also having an attached collection control mechanism with an inlet check valve configured to admit groundwater into the collection chamber when opened. The method further comprises disposing the body and attached collection control mechanism at the location of the groundwater to be sampled and applying a vacuum to the collection chamber to cause the check valve to open and groundwater to be admitted to the collection chamber.

BRIEF DESCRIPTION OF THE FIGURES

Reference will now be made in detail to one or more exemplary embodiments of the present invention as illustrated in the accompanying drawings. Wherever possible, the same reference numbers will be used throughout the drawings to refer to the same or like parts.

FIG. 1 shows a detailed view of an unassembled exemplary system for discrete groundwater sampling. In some embodiments, system 100 may include top cap 1. In some embodiments, top cap 1 may be constructed of acrylic, PVC, or any plastic. In some embodiments, top cap 1 may be constructed of any, water-impervious material. In some embodiments, such as depicted in FIGS. 1 and 2, top cap 1 is cylindrical in shape, has a hollow interior, is closed at the top, and has a bottom opening.

Figures 1, 2:
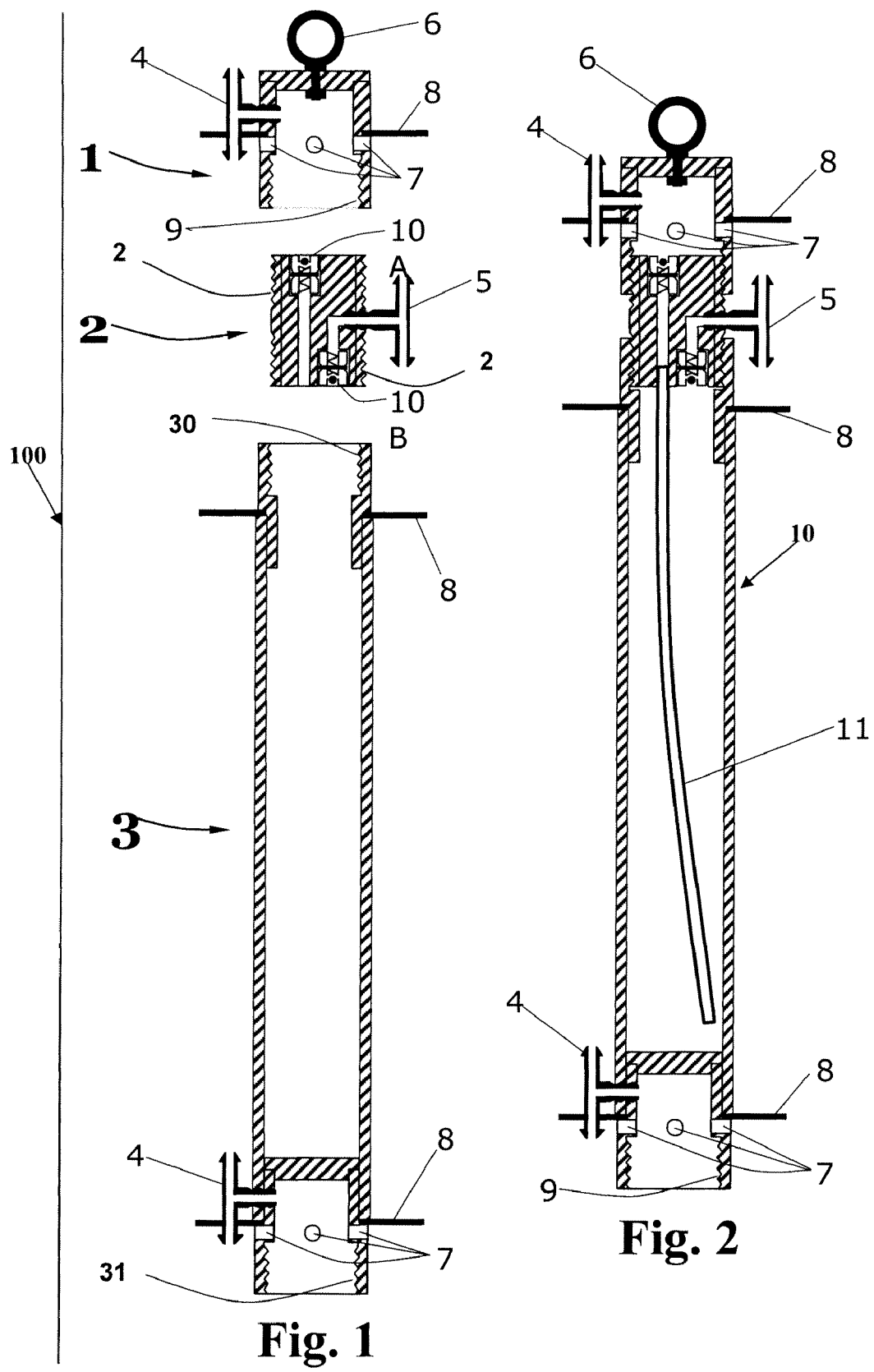
FIG. 1 shows a detailed view of an unassembled exemplary system for discrete groundwater sampling.
FIG. 2 shows a detailed view of the assembled exemplary system for discrete groundwater sampling of FIG. 1.

In some embodiments, top cap 1 includes one or more groundwater inlet ports 7, through which groundwater to be collected enters system 100. In some embodiments, purge vacuum tube tee 4 is connected to top cap 1. In some embodiments, when system 100 is installed in a monitoring well, purge vacuum tube tee 4 is connected to a vacuum purge tube (not shown). In some embodiments, the vacuum purge tube is connected directly to top cap 1. In some embodiments, a vacuum is applied at purge vacuum tube tee 4 before initiating the sample collection process to purge top cap 1 of stagnant well water that may have collected in top cap 1. Purge vacuum tube tee 4 may be any tube tee capable of connecting to a vacuum purge tube.

In some embodiments, top cap 1 includes baffle 8. Baffle 8 may be configured to stabilize system 100 in the monitoring well and/or help to prevent vertical migration or mixing of groundwater in the monitoring well. Baffle 8 may be made of any water-impervious material suitable for stabilizing system 100 and/or preventing vertical migration. In some embodiments, baffle 8 is constructed of Buna-N or Neoprene.

In some embodiments, top cap 1 may include eye bolt 6 to support system 100 in a monitoring well. In some embodiments, eye bolt 6 is connected to the top of top cap 1. In some embodiments, a cable, rope, or chain (not shown in FIGS. 1 and 2) that extends above ground surface may be connected to eye bolt 6 to support system 100 in the monitoring well and allow system 100 to be easily removed from the monitoring well.

In some embodiments, a bottom opening of top cap 1 may include top cap threaded inner surface 9. In some embodiments, threaded surface 9 is, for example, ¾" tapered national pipe thread.

System 100 includes sample collection control mechanism 2, which mechanism includes elements that control flow into a collection chamber 3. In some embodiments, sample collection control mechanism 2 may be constructed of acrylic, PVC, or another plastic. In some embodiments, sample collection control mechanism 2 may be constructed of any water-impervious material. In some embodiments, sample collection control mechanism 2 is cylindrical in shape. In some embodiments, sample collection control mechanism 2 may be a hollow body open at both ends with an internal solid disk and/or mounting holding check valves 10A and 10B inside the associated cavity. In such embodiments, threads 29 can be provided on the inner top and bottom surfaces for interconnecting to complementary threads 9 and 30 provided at the outer surfaces of top cap 1 and top end of collection chamber 3, respectively.

In some embodiments, such as depicted in FIGS. 1 and 2, sample collection control mechanism 2 may include one or more check valves, such as inlet check valve 10A and outlet check valve 10B. In some embodiments, check valves 10A and 10B are arranged in a configuration such that check valve 10A allows groundwater to flow into sample collection chamber 3 of system 100 only when a vacuum is applied to check valve 10B through collection vacuum tee 5.

In some embodiments, during sample collection, collection vacuum tee 5 is connected to a collection vacuum tube. In some embodiments, a collection vacuum tube is connected directly to collection control mechanism 2.

In some embodiments, sample collection control mechanism 2 comprises threaded outer surface 29 for connecting to inner threads 9 of top cap 1 or inner threads 31 of bottom of sample collection 3 (to be described below). In some embodiments, thread 29 may comprise the entire outside of sample collection control mechanism 2. In some embodiments, the outside sample collection control mechanism 2 may be threaded near its top and its bottom of its length, with a non-threaded portion between the threaded sections 29. In some embodiments, threaded surface 29 is, for example, ¾" tapered national pipe thread.

Groundwater sampling system 100 further includes a sample collection chamber 3 for storing groundwater samples. In some embodiments, when a vacuum is applied at collection vacuum tee 5, collection chamber 3 fills partially or completely with sample groundwater. As shown in FIG. 2, collection control mechanism 2 in some embodiments may also include fill tube 11 coupled to inlet check valve 10A. Fill tube 11 may be of a length such that it reaches or nearly reaches the bottom of sample collection chamber 3 to minimize sample turbulence.

In some embodiments, sample collection chamber 3 comprises one or more baffles 8, which are similar or identical to the baffle 8 connected in some embodiments to top cap 1, as discussed above. In some embodiments, sample collection chamber 3 may be constructed of acrylic, PVC, or any plastic. In some embodiments, sample collection chamber 3 may be constructed of any solid, water-impervious material. In some embodiments, sample collection chamber 3 is cylindrical in shape. In some embodiments, sample collection chamber 3 is open at the top end and is closed adjacent to the bottom end. In some embodiments, sample collection chamber 3 comprises threaded surface 30 at one end. In some embodiments, threaded surface 30 is ¾" tapered national pipe thread.

In some embodiments, the bottom portion of sample collection chamber 3 comprises one or more of the features of top cap 1, for the purpose of chaining of groundwater sampling devices. For example, the bottom portion of sample collection chamber 3 depicted in FIGS. 1 and 2 includes a vacuum tube tee 4 similar or identical to vacuum tube tee 4 discussed above. The bottom portion of sample collection chamber 3 in FIGS. 1 and 2 also includes a baffle 8 similar or identical to baffle 8 discussed above in relation to top cap 1. In some embodiments, the bottom portion of sample collection chamber 3 comprises groundwater inlet ports 7 identical or similar to inlet ports 7 discussed above in relation to top cap 1. The bottom portion of sample collection chamber 3 also includes additional collection system connection threads 31 identical or similar to top cap threads 9 discussed above.

In some embodiments, when sample collection chamber 3 has filled with a desired amount of groundwater, the vacuum is disconnected from system 100 and system 100 is then removed from the well. In some embodiments, sample collection chamber 3 is disconnected from sample collection control mechanism 2, capped, and then sent to a remote site for analysis. Alternatively, groundwater can be analyzed on-site.

Figure 3:
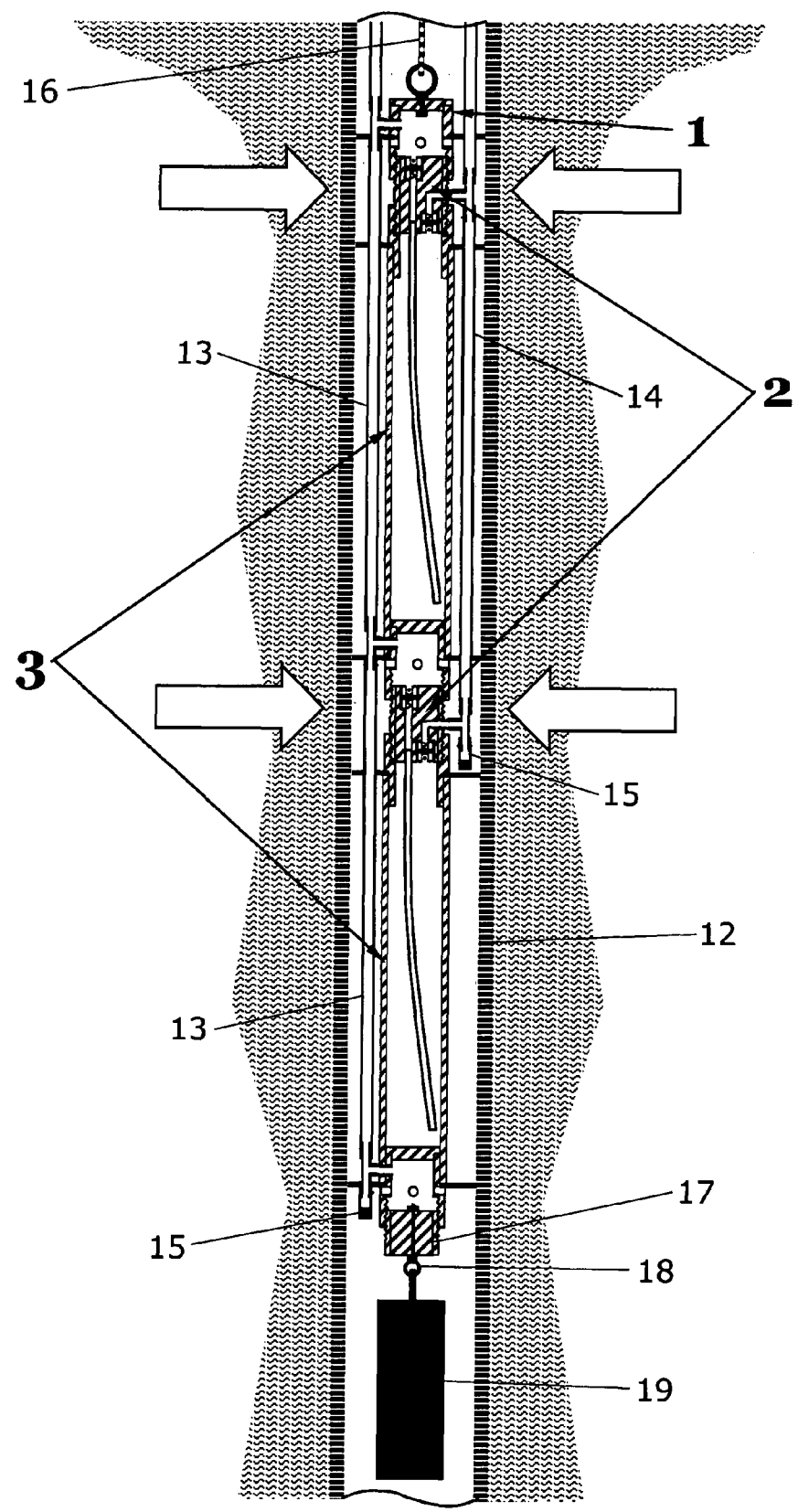
FIG. 3 shows a local environmental view of two coupled exemplary systems of FIG. 1 deployed in a groundwater well.
Figure 4A:
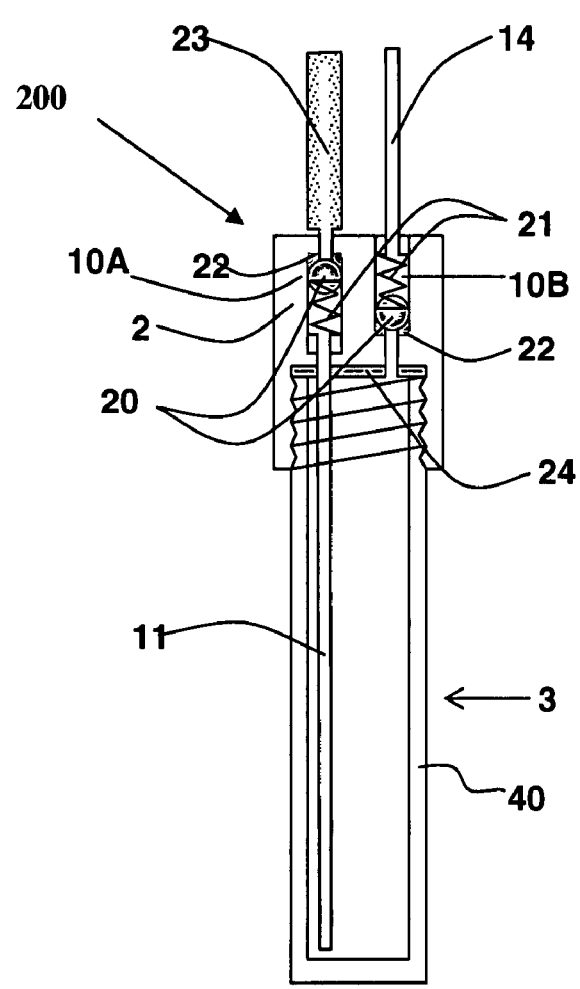
FIG. 4 shows a detailed view of another exemplary system for discrete sampling of groundwater.
Figure 4B:
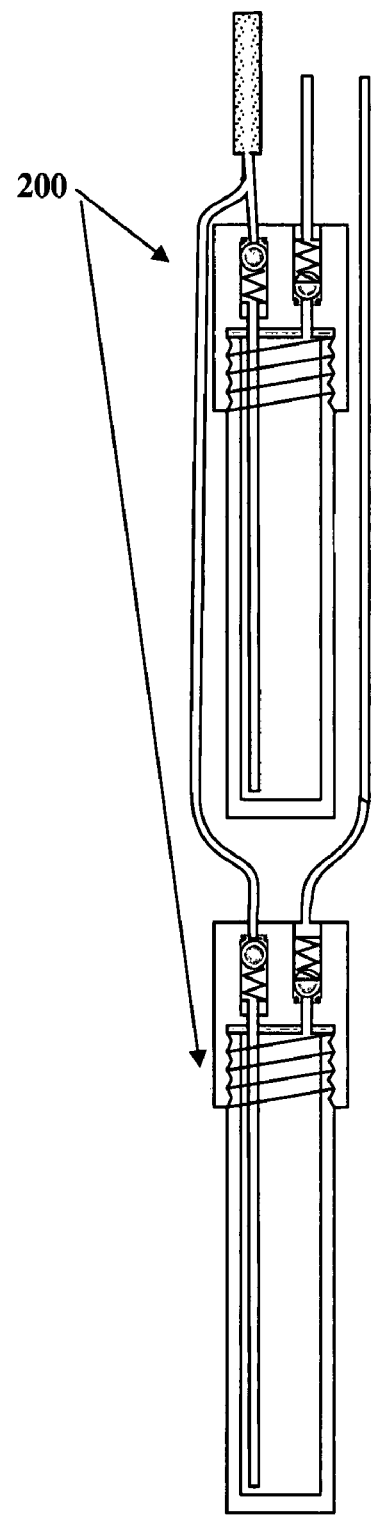
Figure 5:
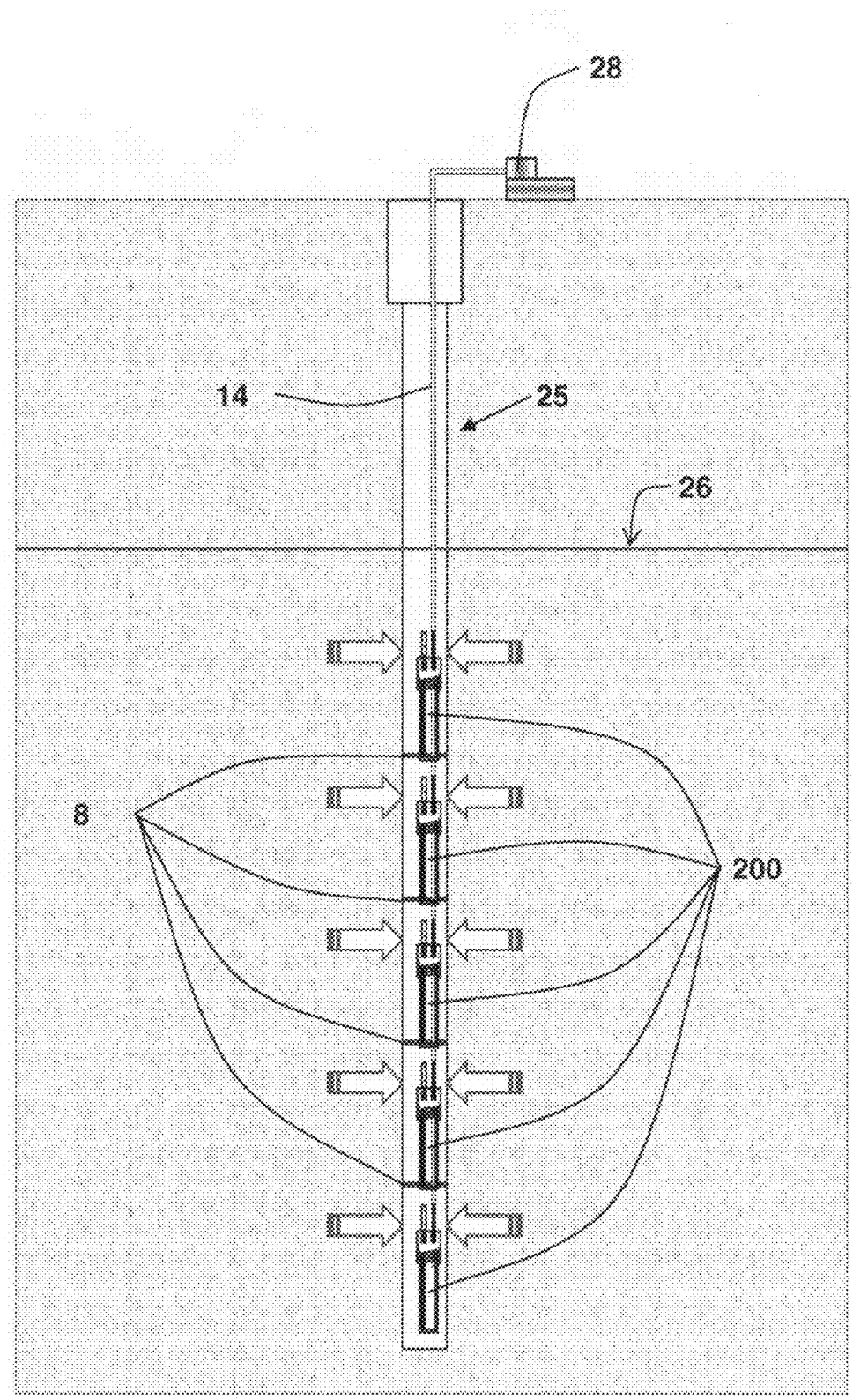
FIG. 5 shows an environmental view of a chain of exemplary systems installed in a groundwater well and connected to a vacuum pump.

In some embodiments, two or more groundwater sampling systems 100 are coupled, or "chained." For example, as depicted in FIG. 3, two sampling devices 100 may be chained by screwing threads 29 of the sample collection control mechanism 2 of a second device 100 into threads 31 of the first system's sample collection chamber 3, or vice-versa. It is possible to chain many systems 100 in this manner. In such embodiments, only the first system 100 in a chain includes a top cap 1. As will be discussed in more detail below, and as seen in FIG. 3, purge vacuum tees 4 of the individual systems 100 are fluidly coupled by vacuum tubes 13, and collection vacuum tees 5 are coupled by vacuum tubes 14. In some embodiments, such as depicted in FIGS. 4 and 5, the two or more chained groundwater sampling devices 100 are also physically coupled only by one or more of the vacuum tubes.

FIG. 3 shows a local environmental view of two exemplary systems 100 deployed in a groundwater well. Two groundwater collection systems are coupled to form a chain. In some embodiments, the groundwater sampling system 100 chain is placed into a monitoring well, in the lower part thereof, where well casing 12 from which the monitoring well is constructed is perforated with slots to allow water to pass through. The groundwater sampling system 100 chain is supported in the well by support cable 16. Support cable 16 is any material capable of supporting the weight of the chain of systems 100 in the monitoring well. In some embodiments, support cable 16 is a nylon cord. In some embodiments, support cable 16 is a chain or rope.

In some embodiments, the chain of systems 100 comprises one or more vacuum purge tubes 13, which connect to systems 100 at purge tube tees 4 and extend above ground surface. In some embodiments, the connections effectively create one long purge tube connecting all systems 100 and having one tube opening above ground level. However, a separate purge tube 13 could be used for each system 100 in the chain. In some embodiments, the lowermost purge tube tee 4 in the chain of systems 100 is sealed with end cap 15. In some embodiments, when a vacuum is applied to the one or more purge tubes 13, any stale groundwater that has collected in top cap 1 and/or in the sealed-off bottom portion of collection chamber 3 of systems 100 is purged.

In some embodiments, the chain of systems 100 comprises one or more collection vacuum tubes 14, which connect to systems 100 at collection vacuum tube tees 5 and extend above ground surface. In some embodiments, the connections effectively create one collection vacuum tube 14 connecting all systems 100 and having one tube opening above ground level. In some embodiments, a separate collection vacuum tube 14 could be used for each system 100 in the chain. In some embodiments, the lowermost collection vacuum tube tee 5 in the chain of systems 100 is sealed with end cap 15. In some embodiments, when a vacuum is applied to the one or more collection vacuum tubes 14, check valve 10A (FIG. 1) allows groundwater to enter sample collection chambers 3.

In some embodiments, the last system 100 in the chain includes an end plug 17. In some embodiments, the last system 100 in the chain further includes a weight 19 coupled to the bottom of the last system 100 in the chain, such as, for example, by eye bolt 18 shown in FIG. 3, for further stabilization of systems 100 in the monitoring well.

FIG. 4 shows a detailed view of another exemplary system for discrete sampling of groundwater. System 200 consists of a collection control mechanism 2 that contains two check valve mechanisms 10A and 10B that control one-way flow of groundwater in and air out of sample collection chamber 3, respectively. The check valve mechanisms may include a ball bearing 20, check valve spring 21, and check valve seat 22, which may be a washer contained within collection control mechanism 2. In some embodiments, the check valve mechanisms operate by holding a ball bearing 20 against the check valve washer 22 with check valve spring 21 forming a seal. A seal is maintained between collection control mechanism 2 and sample collection chamber 3 by collection chamber gasket 24.

In some embodiments, when a vacuum is applied to system 200 the check valve mechanism allows groundwater or air to pass through. Air within the sample collection chamber 3 is extracted past outlet check valve 10B by applying a vacuum to the collection vacuum tube 14. Groundwater enters the sample collection chamber 3, which can be a vial 40 through the groundwater inlet filter 23. System 200 may include fill tube 11 which as in systems 100 may be of a length such that it reaches or nearly reaches the bottom of sample collection chamber 3 to minimize sample turbulence.

In some embodiments, system 200 comprises a septum that may be part of gasket 24, through which a measured portion of the groundwater sample can be extracted, such as by a syringe or other means, from the sample collection vial for analysis.

FIG. 5 shows an environmental view of a chain of exemplary systems installed in a groundwater well and connected to a vacuum pump. In some embodiments, such as the embodiment of FIG. 5, a plurality of systems 200 are coupled and placed in monitoring well 25 below water table 26. Systems 200 may be connected in series by vacuum tube 14, which extends up monitoring well 25 to above ground surface, where it is connected to vacuum pump 28. Vacuum pump 28 may be any device capable of creating a vacuum. Each system 200 may be isolated in monitoring well 25 by a baffle 8. In some embodiments, baffle 8 is a circular divider made of plastic or rubber that slips over system 200. In some embodiments, baffle 8 is any device suitable for centering and isolating system 200 in monitoring well 25. That is, in addition to centering systems 200, baffles 8 may aid in preventing vertical groundwater mixing and turbulence in monitoring well 25, thus isolating each discrete sample interval surrounding a specific system 200.

Installation of a plurality of systems 200 in monitoring well 25 allows for the collection of groundwater samples at a plurality of discrete depths. In some embodiments, systems 200 may be spaced a uniform distance from one another. In some embodiments, spacing distance between systems 200 may vary.

Other embodiments will be apparent to those skilled in the art from consideration of the specification and practice of the disclosure herein. It is intended that the specification and examples be considered as exemplary only, and not an exhaustive list of every combination of features that may comprise the invention described herein.

What is claimed is:

1. A system for collecting groundwater samples at two or more locations below ground surface, the system comprising:
   at least two bodies, wherein each body is configured to be disposed below ground surface and comprises:
   a sample collection chamber;
   a collection vacuum tube in flow communication with the sample collection chamber; and
   a sample collection mechanism attached to the sample collection chamber, the sample collection mechanism comprising a first check valve for admitting groundwater from the below ground surface location into the sample collection chamber when a vacuum is applied to the collection vacuum tube;
   wherein the collection vacuum tube of a first of said at least two bodies is flow connected to the collection chamber of said first of said at least two bodies by a tee fitting and wherein the collection vacuum tube of a second of said at least two bodies is flow connected between said tee fitting and the sample collection chamber of the second of said at least two bodies.

2. The system as in claim 1, further comprising a controllable vacuum source operatively connected to the collection vacuum tube of each of said at least two bodies.

3. The system as in claim 2, wherein the vacuum source is positioned at or above ground surface.

4. The system as in claim 1, wherein the sample collection mechanism of at least one of said at least two bodies further comprises a second check valve, and the collection vacuum tube of the at least one of said at least two bodies is in flow communication with the second check valve configured to allow flow out of the sample collection chamber of the at least one of said at least two bodies.

5. The system as in claim 1, wherein at least one of said at least two bodies further comprises a groundwater inlet in flow communication with the first check valve of the at least one of said at least two bodies.

6. The system of claim 5, wherein the at least one of said at least two bodies further comprises at least one purge vacuum tube in flow communication with the groundwater inlet of the at least one of said at least two bodies.

7. The system of claim 6, wherein when a vacuum is applied to the at least one purge vacuum tube, groundwater is evacuated from the groundwater inlet of the at least one of said at least two bodies.

8. The system of claim 6, wherein the at least one purge vacuum tube comprises at least one purge vacuum tube tee connected to the groundwater inlet of the at least one of said at least two bodies.

9. The system of claim 6, further comprising at least one purge vacuum tube tee connected to the sample collection chamber of the at least one of said at least two bodies, wherein the at least one purge vacuum tube is coupled to the at least one purge vacuum tube tee.

10. The system of claim 6, further comprising an end cap enclosing one end of the at least one purge vacuum tube.

11. The system as in claim 5, wherein the groundwater inlet further comprises an inlet chamber and one or more inlet ports configured and positioned for receiving groundwater from the below ground surface location into the inlet chamber of the at least one of said at least two bodies.

12. The system as in claim 11, further comprising a purging vacuum tube in flow communication with the inlet chamber of the at least one of said at least two bodies.

13. The system as in claim 12, further comprising a controllable vacuum source operatively connected to the purging vacuum tube.

14. The system as in claim 13, wherein the vacuum source is positioned at or above ground surface.

15. The system as in claim 11, wherein the inlet chamber of the at least one of said at least two bodies is formed by a bottom part of a second of said at least two bodies, and the one or more inlet ports are disposed in a wall of the second of said at least two bodies.

16. The system as in claim 7, wherein the inlet chamber is formed by a top cap attached to the sample collection mechanism of the at least one of said at least two bodies, and the one or more inlet ports are disposed in a wall of the top cap.

17. The system of claim 16, wherein the top cap is coupled to the sample collection control mechanism of the at least one of said at least two bodies by a threaded connection.

18. The system as in claim 5, wherein the groundwater inlet further comprises a filter member.

19. The system as in claim 1, wherein said at least two bodies are suspended below ground surface by said collection vacuum tube.

20. The system of claim 1, further comprising at least one baffle for stabilizing the said at least two bodies and for reducing vertical migration of groundwater in a monitor well.

21. The system of claim 1, further comprising a ballast weight suspended from the bottom of the system.

22. The system of claim 1, further comprising an end plug housed partially or completely within the sample collection chamber of the lowermost of said at least two bodies.

23. The system of claim 1, further comprising a suspension means for suspending the system in a monitor well.

24. The system of claim 23, wherein the suspension means comprises at least one of:
 a wire;
 a cord;
 a chain; and
 a rope.

25. The system of claim 1, wherein the sample collection mechanism of at least one of said at least two bodies comprises at least one baffle for stabilizing the sample collection body of the at least one of said at least two bodies and for preventing vertical migration of groundwater in a monitor well.

26. The system of claim 1, wherein the sample collection chamber of at least one of said at least two bodies comprises a fill tube configured and positioned to admit groundwater to the sample collection chamber of the at least one of said at least two bodies with little or no turbulence.

27. The system of claim 26, wherein the fill tube extends from the first check valve of the at least one of said at least two bodies to or near the bottom of the sample collection chamber of the at least one of said at least two bodies.

28. The system of claim 1, wherein the at least two bodies are coupled to form a chain.

29. The system of claim 28, wherein the at least two bodies are coupled by threading a first of said at least two bodies into a second of said at least two bodies.

30. The system of claim 28, wherein each body comprises at least one purge vacuum tube in flow communication with the sample collection mechanism, and wherein the at least two bodies are coupled by coupling the at least one purge vacuum tube of a first of said a least two bodies to the at least one purge vacuum tube of a second of said at least two bodies.

31. The system of claim 28, wherein the at least two bodies are coupled by coupling the collection vacuum tube of a first of said at least two bodies to the collection vacuum tube of a second of said at least two bodies systems.

* * * * *